Oct. 21, 1952 C. B. DALE 2,614,845
WIRE RECORDER
Filed Jan. 3, 1951 3 Sheets-Sheet 1

INVENTOR.
Colin B. Dale
BY
Chunning & Chunning
Attys.

Oct. 21, 1952 C. B. DALE 2,614,845
WIRE RECORDER
Filed Jan. 3, 1951 3 Sheets-Sheet 2
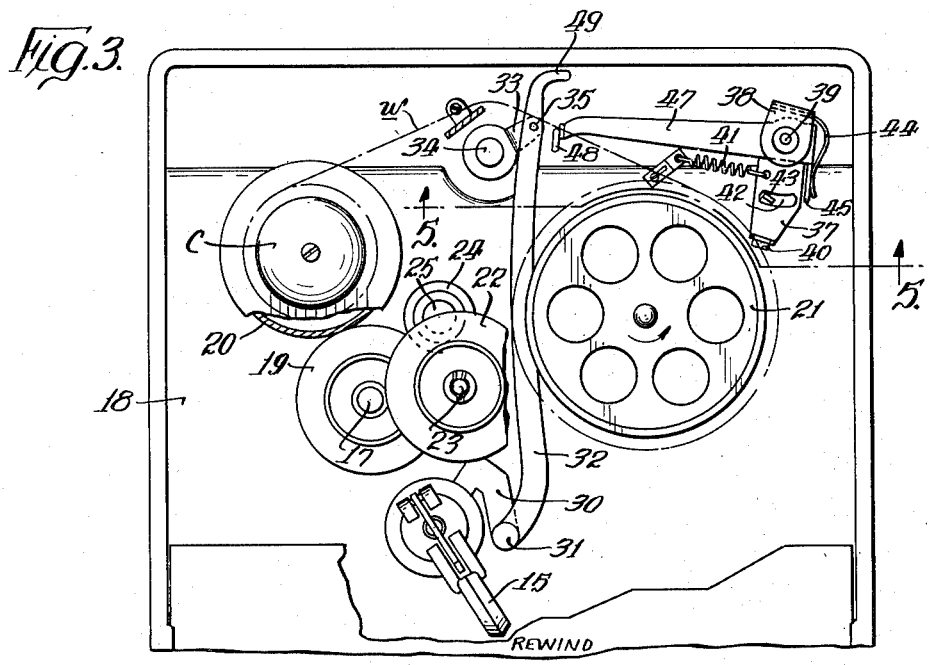
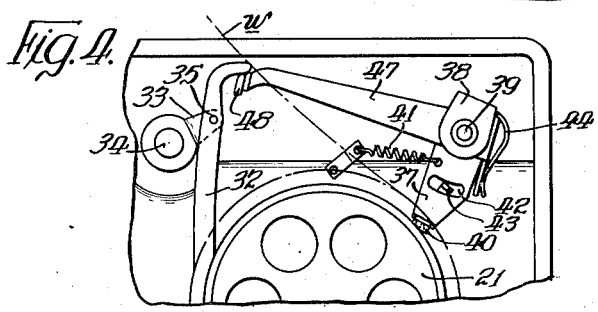
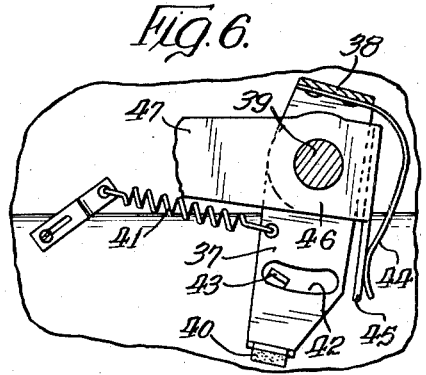
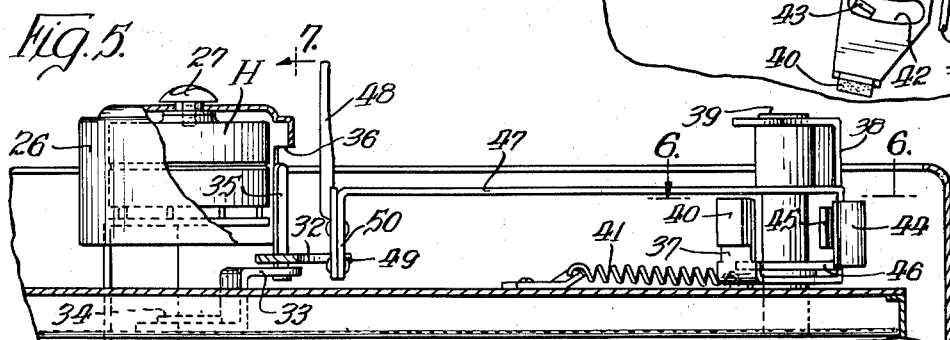
INVENTOR.
Colin B. Dale Oct. 21, 1952  C. B. DALE  2,614,845
WIRE RECORDER
Filed Jan. 3, 1951  3 Sheets-Sheet 3

INVENTOR.
Colin B. Dale
BY Banning & Banning
Attys.

Patented Oct. 21, 1952

2,614,845

UNITED STATES PATENT OFFICE 2,614,845

WIRE RECORDER

Colin B. Dale, Oak Park, Ill., assignor to Webster-Chicago Corporation, Chicago, Ill., a corporation of Illinois Application January 3, 1951, Serial No. 204,166

4 Claims. (Cl. 274—4)

This invention relates to a sound recording and reproducing mechanism utilizing a magnetizable medium, such as a steel wire, tape, or other material which is capable of being magnetized. Instruments of this type are commonly known as "wire recorders," and will be so referred to herein. The term "wire" will also be used in a generic sense to include any of the long-length magnetizable mediums such as those already noted.

The wire is regularly wound onto supply spools and, when operated in a wire recorder, is then wound onto a take-up spool, and later rewound back onto the supply spool. The wire may be reused many times and is subject to wear and breakage. The rewinding of the supply spool is done at high speed and much of the wear occurs during this operation. If the wire happens to break the inertia of the take-up spool causes it to continue to turn so that frequently a bundle of loose wire will form on the spool before it comes to a stop.

One object of my invention is to provide means for automatically stopping rotation of the take-up spool in the event of wire breakage between the spools. This is accomplished by a slack-wire braking device which has an arm adapted to ride against the tensioned wire traveling from the take-up spool to the supply spool during a rewinding operation; in the event the wire breaks, this arm permits a self-acting brake shoe to advance against a drum at the take-up spool and snub it to a quick stop.

Another object of my invention is to arrange the arm carrying the brake shoe so that, when it is released into engagement with the drum, the turning movement of the drum will exert a tendency to carry the brake shoe into tighter braking engagement therewith, thereby to assure a quick stop.

Another object of the invention is to provide a device in which the operating arm of the braking device is yieldingly urged against the tensioned wire to assist in maintaining the tension that is requisite for compensating for any slight irregularities in the movement of the wire or in the speed of the spools. This arrangement of the operating arm assures an even and smooth rewinding of each wire onto its supply spool, so that the next time the wire is unwound therefrom it will draw off smoothly and perform better than if the wire coils were laid in a loose or unlevel condition.

Another object of the invention is to remove the wire from the bottom of the groove in the pick-up head when rewinding it from the take-up spool, thereby to reduce wear. It is well known that wear on the pick-up head is greatest when there is a rapid rewinding and drawing of the wire through the groove. In the present device, the wire is so removed from the groove by oscillating the pivotally mounted cap over the pick-up head, that its guide slot directs the wire outwardly from the groove. This has been found to greatly reduce the wear on the groove.

A further object of the invention is to provide certain mechanical connections between the control handle, the braking device and the pick-up head, so that those devices will become effective for conjoint operation when the control handle is turned to rewind position.

With these and various other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 3 is a view similar to Fig. 2, showing the control handle moved to "rewind" position;

Fig. 4 is a fragmentary plan view in which the brakes are shown in engaged position;

Fig. 5 is a fragmentary elevational view, taken as indicated at line 5—5 of Fig. 3;

Fig. 6 is a fragmentary sectional plan view, taken as indicated at line 6—6 of Fig. 5;

Figure 1:
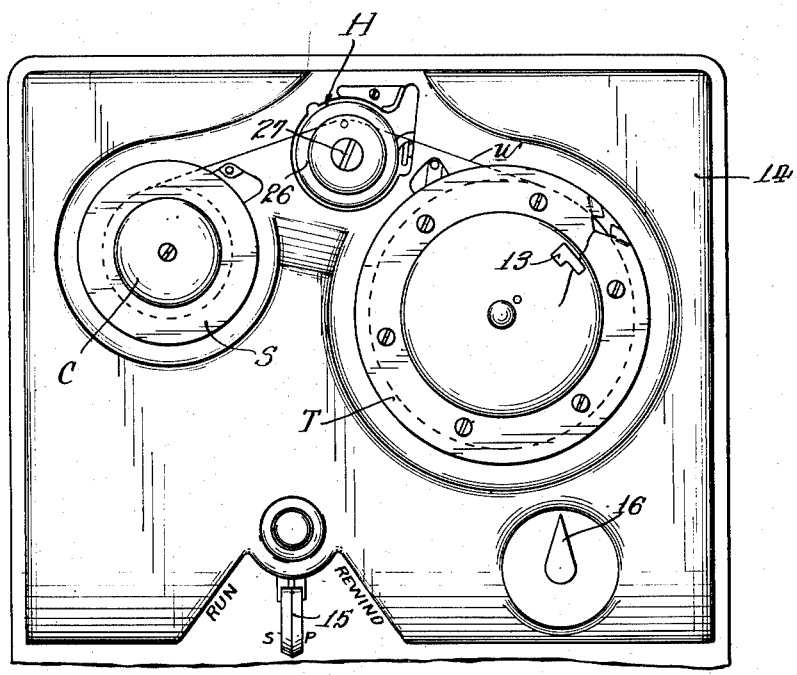
Figure 1 is a fragmentary top plan view of the present wire recorder, showing its cover plate and exposed spools, and indicating various positions of the control handle.
Figure 2:
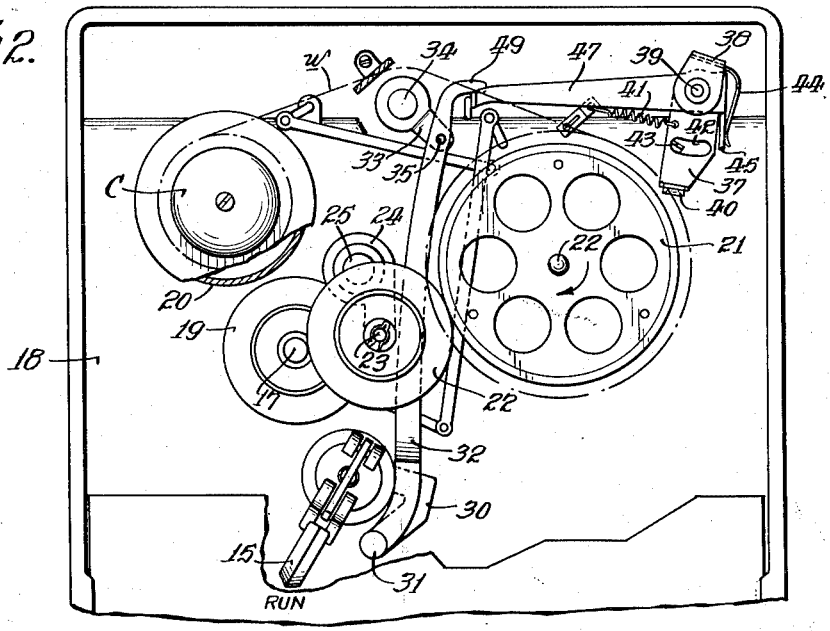
Fig. 2 is a similar view in which the cover plate is removed and the control handle is swung to "run" position.

A wire recorder mechanism of the general kind about to be described is disclosed in Letters Patent No. 2,537,260, dated January 9, 1950, to which reference may be made concerning many details of construction which it is unnecessary to consider here. In such a wire recorder the wire w which is wound on a supply spool S travels through the groove 12 in the pick-up head H to a take-up spool T forming part of a wire recorder. One end of the wire (or leader) is connected to the take-up spool T by being inserted beneath a latching finger 13, as shown in Fig. 1.

The wire recorder may be provided with a cover plate 14 which is appropriately recessed to accommodate the wire supply spool S, the pick-up head H, and the wire take-up spool T. It is recessed at one edge for a control handle 15 which has a "run" position, a "rewind" position and an intermediate "stop" position. A dial pointer 16 for a time indicator may be provided as a separate unit, but is not part of the present invention.

The wire spool S is mounted on a chuck C and driven by a motor (not shown), through its shaft 17 which projects upwardly through an opening in the base plate 18. A friction wheel 19 is fastened on the shaft 17 near its top end. The tread of the friction wheel 19 is adapted for driving engagement with the drum 20 of the chuck to rotate the supply spool S. When the control handle 15 is either in its "run" position or its "stop" position, the motor is caused to move slightly, as by tilting, to shift the friction wheel 19 out of contact with the drum 20. The wire take-up spool T is carried on the top of a cylindrical drum 21 secured to the upper end of a vertical shaft 22 which is journaled in suitable bearings. The details of the motor mount form no part of the present invention. Also, the spools, when in their operative positions and in driving connection with their supporting chucks, are treated as a single element herein and in the claims.

Horizontally aligned with the drum 21 is a friction wheel 22 which functions as an idler between the motor shaft 17 and the take-up spool T. The idler wheel 22 is rotatably mounted on a vertical stub shaft 23 carried by an arm 24 which is fulcrumed on a pivot 25 that is fastened to the base plate 18. When the control handle of the machine is in "run" position, the upper end of the motor shaft 17 is shifted over to engage the tread of the idler wheel 22 to urge the latter against the drum 21 of the take-up spool T. Because of the large diameter of this drum relative to that of the motor shaft 17, the take-up spool T rotates relatively slowly, when driven, the wire speed under these conditions being about one-seventh of that which obtains when the supply spool is being driven by the friction wheel 19. The driving connections thus established between the motor and the drum 21 are, in effect, positive and nonslipping.

The head H houses the coils for recording sound magnetically on the wire w and for picking up the acoustic signal from the wire, depending upon whether the instrument is being operated to record or reproduce the sound. The head H also contains an erasing coil for demagnetizing the wire, so as to clear it of any previous recording when the instrument is being operated for recording purposes, as is familiar to those skilled in the art. Inasmuch as these portions of the apparatus are conventional, a detailed description is unnecessary. A groove or notch 12 is provided for reception of the wire w by which it is also guided in its movements between the supply and take-up spools. The head H may be mounted to reciprocate slowly in a vertical direction, so as to assure level winding of the wire on whichever spool it is to be received.

Figure 9:
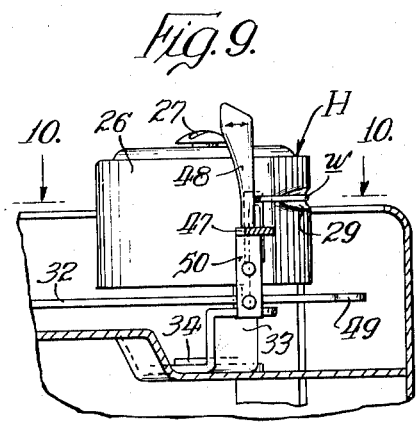
Fig. 9 is a view similar to Fig. 7, showing the cap for the pick-up head in the position to which it is turned when rewinding of the wire onto the supply spool takes place.
Figure 10:
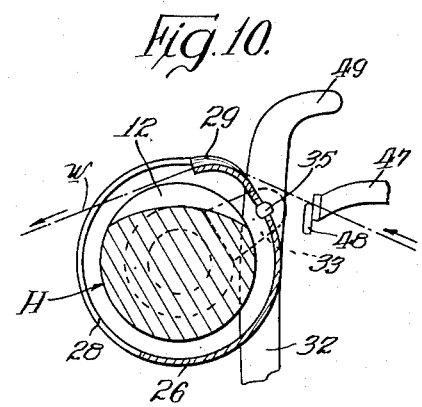
Fig. 10 is a fragmentary plan sectional view, taken as indicated at line 10—10 of Fig. 9.

An inverted cup-shaped metal cap 26 is pivotally mounted on the top of the head by means of a cap screw 27. It is provided with a guide slot 28 which terminates at one end in a smooth, inwardly rounded guide channel 29, so that when the cap is turned to the position shown in Figs. 9 and 10 the wire is displaced outwardly from the groove 12 of the head.

Figure 7:
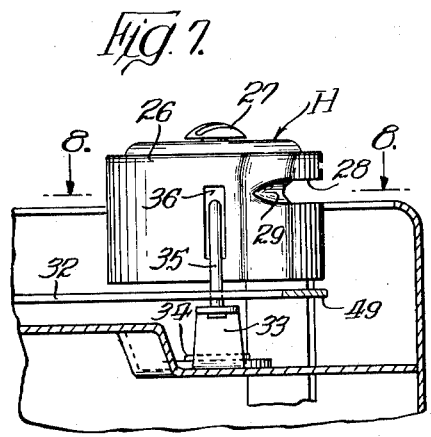
Fig. 7 is a fragmentary vertical sectional view of the pick-up head.
Figure 8:
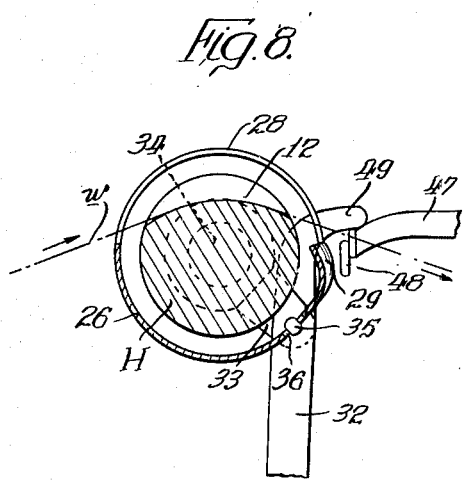
Fig. 8 is a plan sectional view, taken as indicated at line 8—8 of Fig. 7.

The control handle 15 has an arm 30 which is pivotally connected at 31 to a link 32. A crank arm 33 is concentrically mounted beneath the head, as indicated at 34, and is pivotally connected with the link 32 by an upwardly extending finger 35 which engages a slot 36 in the cap 26, so that when the control handle is turned to the "run" position the wire will enter the groove 12, as shown in Figs. 7 and 8. When the control handle 15 is turned to the "rewind" position, the cap will be oscillated to the position shown in Figs. 9 and 10 where it acts to advance the wire outwardly so as to by-pass the groove 12 in the pick-up head. This reduces the friction on the wire, and reduces the wear on both the wire and the pick-up head.

The wire is maintained under tension while it is moving or stationary in the machine, and is prevented from overrunning on either spool so as to prevent its fouling or snarling. To this end, a suitable dual braking mechanism is provided and is operable through manipulation of the control handle for selectively braking either spool. As that mechanism is not part of the present invention, it is not illustrated in the accompanying drawings.

The present invention provides a slack-wire braking device which is controlled by the tension on the wire, and in the event of wire breakage quickly stops the winding movement of the take-up spool. As shown in Figs. 1–5, the automatic brake has a brake arm 37 with a U-shaped bearing portion 38 on the pivot 39. The free end of the arm 37 is provided with friction material 40 which is urged into engagement with the drum 21 by a tension spring 41. During an unwinding operation the drum 21 turns counter-clockwise, as viewed in Figs. 2 and 3, and the pivot 39 is so positioned that when the friction material 40 touches the drum further rotation of the drum tightens the brake pressure so as to produce a quick stop by a snubbing action.

The brake arm 37 has a slot 42 which is traversed by a detent 43 to limit the movement of the arm. The bearing portion 38 is provided with a leaf spring 44, as best shown in Fig. 6. This spring normally urges the brake arm out of braking position by pressure on a finger 45 provided on the U-shaped bearing portion 46 of an operating arm 47 which is pivotally mounted on the pivot 39. The other end of the operating arm 47 is provided with an upwardly extending guide finger 48 which rides against the inside of the tensioned wire w during a rewind operation, as shown in Fig. 3. Should the wire break, the arm 47 becomes free to swing upwardly, as viewed in Fig. 3, and this will cause the brake to set, as shown in Fig. 4, and stop the wire from spilling from or snarling around the take-up spool.

Figure 11:
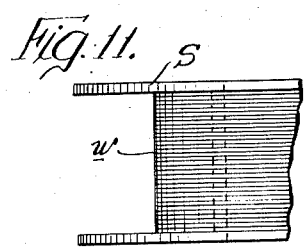
Fig. 11 is a fragmentary elevational view of one of the spools.

The operating arm 47 performs an added function, due to its yielding mounting, of maintaining a more even tension on the wire $w$ even though there are slight irregularities in the speed of the two spools. The arm is free to rock slightly under the influence of the spring and cooperate with the pick-up head, thus providing for a smooth and level winding of the wire on the spool, as shown in Fig. 11.

As the slack-wire braking device is only needed during a rewind operation, it is turned out of operative position when the control lever is turned to "run" position. This is accomplished by a hook-shaped end portion 49 on the link 32 which engages a downward extension 50 on the arm 47 and draws it to the position shown in Fig. 2. Of course, it is released to engage the wire when the control handle is turned to "rewind" position.

I claim:

1. A wire recorder having motor-driven supply and take-up spools, and a grooved pick-up head provided with a rotatably mounted cap having a side wall surrounding the head, the side wall being provided with a guide slot wholly positioned on one side of the axis of rotation of the cap and extending parallel to the wire in its movement from spool to spool, a control handle regulating a driving connection between the motor and either spool, said handle having a "run" position and a "rewind" position, and a link connecting said cap and the control handle so that when said handle is moved to "run" position the guide slot is aligned with the groove in the head whereby a wire connecting said spools may be drawn through said groove, and when said handle is moved to "rewind" position the cap will be rotated to a position wherein the slot is misaligned with the groove to maintain the wire spaced from the groove in the pick-up head.

2. A device as specified in claim 1, in which control handle is pivotally mounted and has an arm connected to the link, a crank is concentrically mounted beneath the cap, and said link is connected to said crank and is provided with a finger to engage said cap.

3. A wire recorder having a housing, motor-driven supply and take-up spools in the housing, and a grooved pick-up head mounted on said housing and provided with a pivotally mounted cap having a side wall surrounding the head, the side wall being provided with a guide slot wholly positioned on one side of the axis of rotation of the cap and extending parallel to the wire in its movement from spool to spool, a braking device movably mounted on the housing and having a first portion engaging the wire and a second portion to engage the take-up spool said first portion maintaining said second portion free of the spool when said wire is under tension and permitting braking engagement with the take-up spool when the tension in the wire is relieved, a control handle regulating a driving connection between the motor and either spool, said handle having a "run" position and a "rewind" position, a link connecting said cap and the control handle so that when said handle is moved to "run" position the guide slot is aligned with the groove in the head whereby a wire connecting said spools may be drawn through said groove, and when said handle is moved to rewind position the cap will be rotated to a position wherein the slot is misaligned with the groove to maintain the wire spaced from the groove in the pick-up head, and a finger on said link to engage said first portion of the braking device to hold the second portion out of braking engagement with the take-up spool to render it ineffective to stop the take-up spool.

4. A wire recorder having a motor-driven supply and take-up spools interconnected by a wire arranged to be drawn through a fixed path while unwinding from one spool and winding onto the other, means for automatically stopping rotation of said take-up spool in the event of wire breakage between the spools comprising a pivotally mounted brake arm yieldingly urged towards stopping engagement with the take-up spool, a pivotally mounted operating arm having one finger adapted to ride against the tensioned wire traveling from the take-up spool to the supply spool, a second finger to hold said brake arm out of engagement with said spool while the wire is maintained under tension, a control handle to control the driving of the spools, said handle having a "run" position and a "rewind" position, a link connected to said control handle and a finger on the link to render said operating arm ineffective to stop the take-up spool when the control handle is in the "run" position.

COLIN B. DALE.

REFERENCES CITED

The following references are of record in the file of this patent:

UNITED STATES PATENTS

| Number | Name | Date |
| --- | --- | --- |
| 2,074,237 | Pierce | Nov. 16, 1937 |
| 2,535,486 | Dank | Dec. 26, 1950 |

FOREIGN PATENTS

| Number | Country | Date |
| --- | --- | --- |
| 414,776 | Germany | June 16, 1925 |
| 716,409 | France | Oct. 6, 1931 |